United States Patent [19]

Fukatsu et al.

[11] Patent Number: 5,781,898
[45] Date of Patent: Jul. 14, 1998

[54] DATA RETRIEVAL CONDITION SETTING METHOD

[75] Inventors: Junko Fukatsu; Hiromi Kato, both of Kawasaki, Japan

[73] Assignee: Fujitsu Limited, Kawasaki, Japan

[21] Appl. No.: 941,108

[22] Filed: Sep. 30, 1997

Related U.S. Application Data

[63] Continuation of Ser. No. 418,600, Apr. 6, 1995, abandoned.

[30] Foreign Application Priority Data

Jun. 29, 1994 [JP] Japan ................................ 6-147474

[51] Int. Cl.$^6$ ................................................ G06F 17/30
[52] U.S. Cl. ................................ 707/4; 707/5; 707/2
[58] Field of Search ................................ 707/4, 5, 2

[56] References Cited

U.S. PATENT DOCUMENTS

| | | | |
|---|---|---|---|
| 5,175,814 | 12/1992 | Anick et al. | 395/161 |
| 5,227,122 | 7/1993 | Scarola et al. | 376/259 |
| 5,278,980 | 1/1994 | Pedersen et al. | 395/600 |
| 5,421,008 | 5/1995 | Banning et al. | 395/600 |
| 5,428,737 | 6/1995 | Li et al. | 395/161 |
| 5,428,776 | 6/1995 | Rothfield | 395/600 |
| 5,455,945 | 10/1995 | VanderDrift | 395/600 |
| 5,515,488 | 5/1996 | Hoppe et al. | 395/600 |
| 5,555,345 | 9/1996 | Strasnick et al. | 395/127 |
| 5,584,024 | 12/1996 | Shwartz | 707/4 |
| 5,619,709 | 4/1997 | Caid et al. | 707/532 |
| 5,644,686 | 7/1997 | Hekmatpour | 395/50 |

*Primary Examiner*—Wayne Amsbury
*Attorney, Agent, or Firm*—Staas & Halsey

[57] ABSTRACT

When an operator inputs a unit retrieval condition and a logic symbol, a condition input section stores them in a condition storage section. A condition display section displays them alternately one after another on a display device. When the operator inputs specific information for specifying the logic symbol among the displayed logic symbols for which a priority-given retrieval based on the unit retrieval conditions displayed ahead and behind the logic symbol should be performed, a condition operating section raises the priority order of the logic symbol in the condition storage section in accordance with the specific information. The condition display section performs a specific distinguishing display on the logic symbol, indicated by the accepted specific information, and the unit retrieval conditions displayed ahead and behind the logic symbol to distinguish them from other unit retrieval conditions and logic symbols. When the operator operates an execution key, a condition building section logically builds a data retrieval condition for retrieving data from a database, from the input unit retrieval conditions, the logic symbols and the specific information.

7 Claims, 12 Drawing Sheets

```
PREFECTURE NAME = 'TOKYO'

AND

COMPANY NAME IN ('IZUYA', 'TOZAI STORE')
OR
SALES > 1000000

OR

EMPLOYEES > 500
```

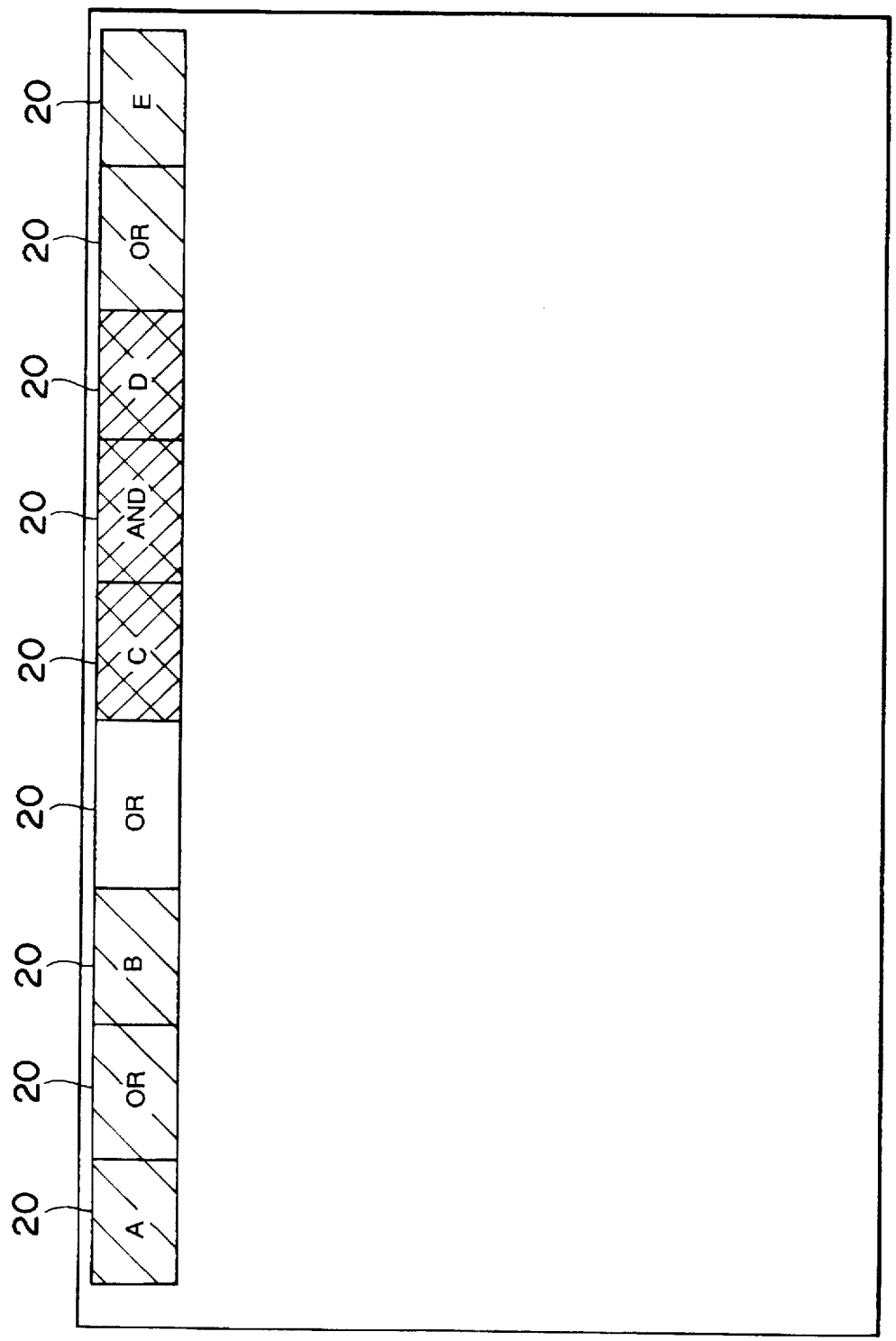

DATA RETRIEVAL CONDITION SETTING METHOD

This application is a continuation of application Ser. No. 08/418,600, filed Apr. 6, 1995, now abandoned.

BACKGROUND OF THE INVENTION

1. Field of the Invention

The present invention relates to a system for setting a condition for a data retrieval from a database, and, more particularly, to a system for setting logic symbols, which should be treated with a higher level of priority in a retrieval process, from a series of data retrieval conditions, and displaying such logic symbols.

2. Description of the Related Art

Software for a data retrieval from a database is used to obtain data which satisfies a specific condition from data stored in the database. This data retrieval software analyzes a condition for the data retrieval specified by an operator, translates it to a database language (e.g., the SQL for a relational database) which matches with the data structure of this database, and executes the retrieval.

Conventional pieces of software for a data retrieval from a database provide various methods for operators to specify data retrieval conditions. But, those methods all fundamentally build a retrieval formula specific to each retrieval from a database. The retrieval formula specific to a database retrieval is what is obtained by linking individual unit conditions (e.g., "keyword," "range of time stamp of data," "data issuer," etc.) with logic symbols, such as "OR (+)" and "AND (*)," which define the relation between the conditions, as given below.

A OR B OR C AND D OR E.

In retrieving data from a database, however, the priority order of logic symbols as in mathematics ("×" and "+" are given priority over "+" and "−") is not considered and searches based on each inputted individual retrieval conditions with already retrieved data are executed in the input order, in principle. Therefore, the search under the retrieval condition for D in the above retrieval formula retrieves the data which belongs to the "data satisfying A, B or C," originating from the already executed retrieval, and which meets the condition D. If one wants to restrict the range of data over which the logic symbol "AND" accompanying the condition D should be considered to the "data satisfying C," therefore, it is necessary to indicate that the retrieval condition in the range over which this logic symbol "AND" is dominant should be executed with priority over the retrieval conditions associated with the other logic symbols. This is because that obtained data is likely to become quite different depending on how to make the priority order.

The conventional pieces of software for searching a database require that the subject retrieval condition should be parenthesized to set the priority order of the logic symbols (i.e., the retrieval execution order). For example, to execute the retrieval of "C AND D" first, followed by the execution of the retrieval of "E" and "B" in this order, finally execute the retrieval of "A" in the above-given condition formula and to output the resultant sum data, this condition formula should be parenthesized as follows.

A OR (B OR ((C AND D) OR E)).

Thus, the retrieval formulae needed by the conventional pieces of software for searching a database demand operators of the mathematical thinking.

With the recent development of the GUI (Graphical User Interface) employed in pieces of software for computers, even end users who are not acquainted with computers or the grammar of software can operate computers. Accordingly, such end users often retrieve data from databases in accordance with various retrieval conditions and utilize the data. Further, the amount of data stored in each database in a company, a school, an institute, etc., which uses a database system, becomes vaster, and the processing and the analytical techniques demanded from the end users become more complex. As the conditional structure becomes complex, it is unlikely that the required data is obtained merely by the execution of a single retrieval condition. Generally, therefore, retrieval formulae having multifarious variations of retrieval conditions should be prepared and executed through the trial and error basis. It is apparent from the above that a great deal of labors are imposed on an operator who searches a database.

However, the conventional pieces of software for data retrieval demand the preparation of retrieval formulae that requires the mathematical thinking from the operator, and could not therefore relieve the operator the burden put on him or her.

SUMMARY OF THE INVENTION

Accordingly, it is an object of the present invention to provide a data retrieval condition setting method which allows an operator to easily set the priority order of logic symbols without requiring the mathematical thinking.

According to this invention, there is provided a method of setting a data retrieval condition constituted of a plurality of unit retrieval conditions, logic symbols associating the unit retrieval conditions with one another and a symbol for specifying a priority order of the logic symbols, which method comprises the steps of displayed input unit retrieval conditions and logic symbols alternately in order on a display device; receiving specific information for specifying a logic symbol among the displayed logic symbols which is associated with an execution of a priority-given retrieval based on unit retrieval conditions displayed ahead and behind that logic symbol; effecting a distinctive display on the display device to distinguish the logic symbol indicated by the specific information and the unit retrieval conditions displayed ahead and behind the logic symbol from other unit retrieval conditions or other logic symbols; and logically building retrieval condition formula for retrieving data from the database based on the input unit retrieval conditions and logic symbols and the specific information. The individual structural elements will now be described.

A database in this invention includes every database such as a relational database, a network database and a card database.

The unit retrieval condition is a key for retrieving necessary information from a database. Examples of the unit retrieval conditions include the range of the preparation date of data, a keyword, a data creator and the range of a numeral included in data, for example.

The logic symbol is a information which specifies how to link a plurality of unit retrieval conditions. The logic symbols include "OR (+)," "AND (*)" and "NOT," for example. "OR" means the extraction of all data satisfying either the preceding unit retrieval condition or the succeeding unit retrieval condition. "AND" means the extraction of all data satisfying both of the preceding and succeeding unit retrieval conditions.

The information specifying priority order is a information which specifies the range of the unit retrieval condition and logic symbol based on which search is executed with priority over retrievals based on other unit retrieval condition and logic symbol. For example, it is the information about parenthesizing the range of the unit retrieval condition and logic symbol based on which search is executed with a higher level of priority. Such a priority-given range includes at least one logic symbol and unit retrieval conditions located ahead and behind that logic symbol.

The data retrieval condition formula may be a data retrieval statement written in a database language corresponding to the data structure of a database. The retrieval condition formula may be a retrieval formula constructed in such a level that the retrive conditions and the priority order for the condition can be grasped logically.

The direction for alternately displaying unit retrieval conditions and logic symbols may be vertical on the screen of the display device or horizontal as well. In this case, it is preferable that the display positions of the head of each unit retrieval condition and logic symbol are aligned with each other in the initial state immediately after the occurrence of the input event. More specifically, their display positions should be aligned in the same column for the vertical alignment, whereas their display positions should be displayed in the same row for the horizontal alignment. This way, it is easily understood that all the logic symbols and unit retrieval conditions yet have the equal priority. Specific information of the logic symbol based on which a priority-given retrieval is to be executed may have already been input at the time the display process is carried out. Although the unit retrieval conditions and logic symbol associated with this specific information are eliminated from the subjects to be displayed in alignment, it is still within the scope and spirit of this invention as long as unspecified unit retrieval conditions and logic symbols are aligned.

An operator can input the specific information by moving a cursor, displayed on the screen of the display device, over the logic symbol for which the operator wants to input the specific information and then pressing an input key or a click button. Alternatively, the specific information can be specified and entered by dragging the display area of the logic symbol targeted for the input of the specific information with an input device (mouse) connected to a data retrieval apparatus. This way, specific information can be entered without any command using special symbols or the like.

With respect to the range where a distinctive display (i.e. first type of distinctive display) has been made because specific information (i.e. first level of priority) has already been input, specific information (i.e. second level of priority) may further be entered. This design allows specific information to be entered easily even if priority levels should be set hierarchically. What is more, if a second type of distinctive display different from a first type of distinctive display is effected with respect to the logic symbol for which specific information of the second level of priority has been input and the unit retrieval conditions located ahead and behind this logic symbol, such a complicated hierarchical structure can be grasped at a glance. This also ensures easy entry of specific information.

The distinctive display may take the following forms. The background color of the unit retrieval conditions and logic symbol associated with specific information may be set different from the display color of other unit retrieval conditions or logic symbols. The density of the background color of the subject unit retrieval conditions and logic symbol may be set different from that of the background color of other unit retrieval conditions or logic symbols. Alternatively, the display color of the subject unit retrieval conditions and logic symbol themselves may be set different from the display color of other unit retrieval conditions or logic symbols.

Further, the display position of the subject unit retrieval conditions and logic symbol may be shifted from the display positions of other unit retrieval conditions or logic symbols. Particularly, in the case where input unit retrieval conditions and logic symbols are displayed on the display device row after row so that their head display positions are aligned vertically in the initial state, the columns of the heads of the unit retrieval conditions and logic symbol which are targeted for the distinctive display may be shifted by a given amount. The above distinctive display styles allows the same distinctive display to be carried out for the range which is given the same level of priority, and can also make this range distinguished from ranges which are given other levels of priority. This permits an operator to grasp the retrieval conditions more easily.

Data retrieval condition formula can logically be built from the unit retrieval conditions, the logic symbols and the specific information inputted respectively, in such a manner that a retrieval based on the logic symbol indicated by the specific information and the unit retrieval conditions displayed ahead and behind this logic symbol is executed with a higher level of priority and a retrieval based on another logic symbol and unit retrieval conditions is further executed with respect to data obtained from the priority-given retrieval.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 13 is a diagram showing the state where two levels of priority-given retrieval blocks are set according to the second embodiment of this invention.

DETAILED DESCRIPTION OF THE PREFERRED EMBODIMENTS

Preferred embodiments of the present invention will be described below with reference to the accompanying drawings.

First Embodiment
<Principle of First Embodiment>

Figure 1:
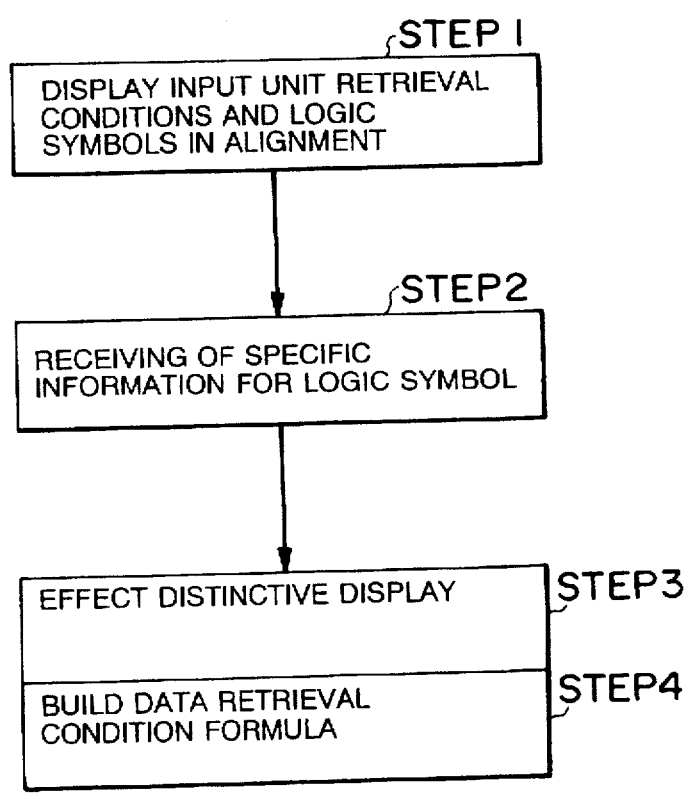
FIG. 1 is a diagram showing the principle of a first embodiment of the present invention.

The principle of this embodiment is illustrated in FIG. 1. As shown in FIG. 1, first, input unit retrieval conditions and logic symbols are alternately aligned and displayed in order on a display device (STEP 1). When an operator inputs specific information for specifying the logic symbol among the displayed logic symbols for which a priority-given retrieval based on the unit retrieval conditions displayed ahead and behind this logic symbol should be performed, the input is accepted (STEP 2). Then, a specific distinctive display is given to the logic symbol indicated by the accepted specific information and the unit retrieval conditions displayed ahead and behind this logic symbol to distinguish them from other unit retrieval conditions and logic symbols (STEP 3). In addition, data retrieval condition formula for retrieving data from a database are logically built from the input unit retrieval conditions and logic symbols and the specific information (STEP 4). Accordingly, the operator can set data retrieval condition formula merely by inputting specific information while viewing the state (the state of the distinctive display) on the display device.

<System Structure>

To begin with, the structure of a database system which executes the data retrieval condition setting method of this embodiment will be described with reference to FIG. 2.

Figure 2:
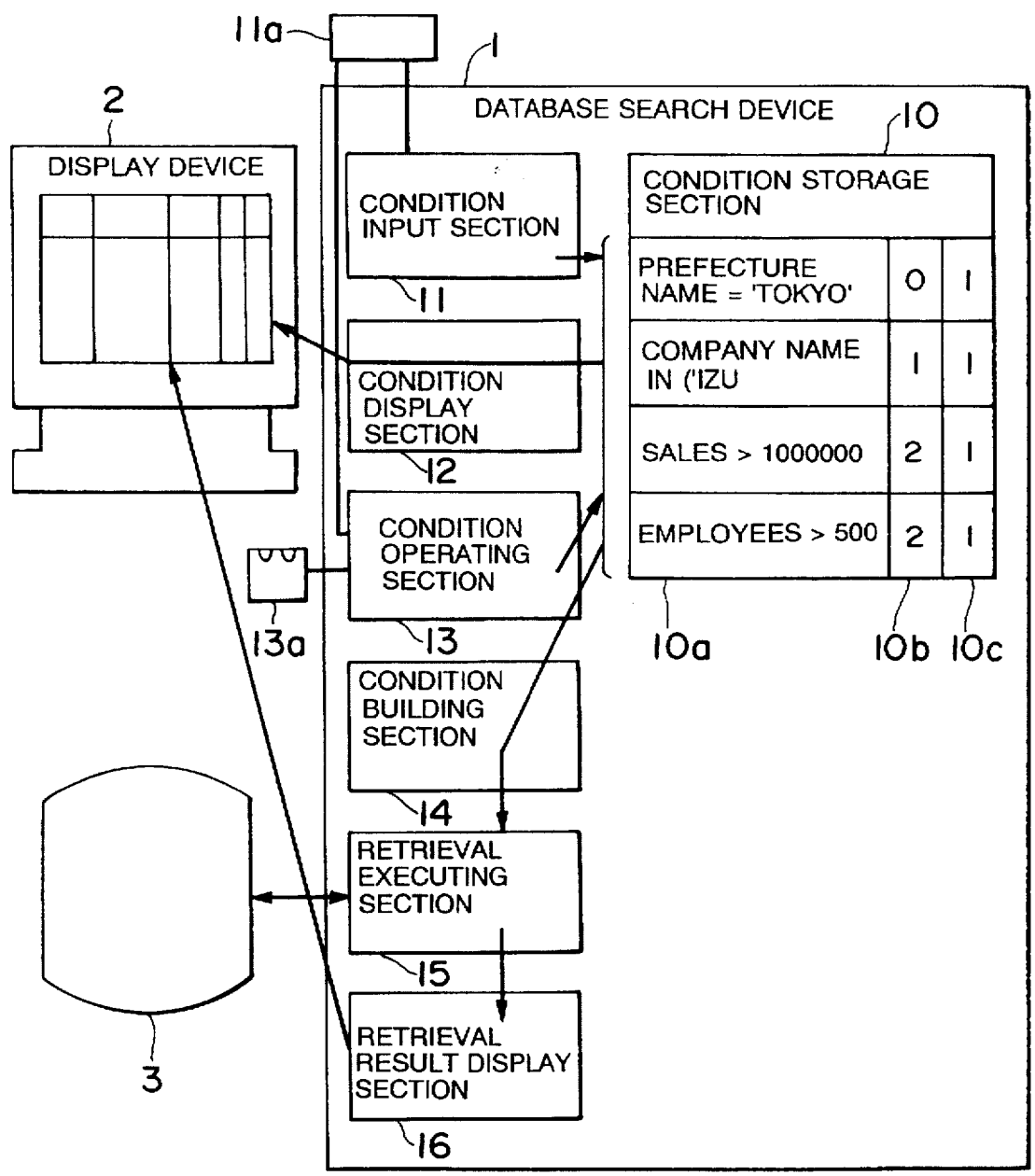
FIG. 2 is a structural diagram of a database system according to the first embodiment of this invention.

As shown in FIG. 2, this database system comprises a database 3 which stores data, a database search device 1 connected to this database 3, and a display device 2, a keyboard 11a and a mouse 13a which are connected to the database search device respectively.

The database search device 1 prepares a retrieval formula for searching the database 3 from the retrieval conditions input via the keyboard 11a by the operator, and searches the database 3 based on this retrieval formula to read necessary data. The display device 2 displays the retrieval conditions before the execution of the retrieval and displays data read as the retrieval result after the execution of the retrieval.

The database search device 1, like an ordinary computer, has a CPU (Central Processing Unit) and MM (Main Memory), neither shown. As a data retrieval program is loaded on this MM and is executed by the CPU, various functional sections illustrated in FIG. 2 are realized. The functional sections are a condition input section 11 connected to the keyboard 11a, a condition storage section 10 connected to this condition input section 11, a condition display section 12, a condition operating section 13 and a condition building section 14, a retrieval executing section 15 connected to the condition building section 14, and a retrieval result display section 16 connected to the retrieval executing section 15. The condition display section 12 is connected to the display device 2. The condition display section 12, the condition operating section 13 and the condition building section 14 are connected to the condition storage section 10. The condition operating section 13 is further connected to the keyboard 11a and the mouse 13a.

The retrieval executing section 15 is connected to the database 3. The retrieval result display section 16 is connected to the display device 2.

The individual sections will now be discussed in detail.

The condition input section 11 stores individual retrieval conditions for the preparation of a retrieval formula, input by the operator via the keyboard 11a, in the condition storage section 10. The individual retrieval conditions are entered one by one by the operator using the keyboard 11a. More specifically, the contents of unit condition formulae ("prefecture name='Tokyo'," "company name IN ('Izuya', 'Tozai Store')," "sales>1000000" and "employees>500") and the type of a logic symbol (1: AND, 2: OR) indicating the relation between each unit condition formula and the directly preceding unit condition formula, as retrieval conditions, are alternately input. If there is no preceding unit condition formula (when it is the head of the retrieval formula), the input of the type of a logic symbol is omitted. The condition input section 11 inputs the individual retrieval conditions, entered therein in this manner, to the condition storage section 10.

The condition storage section 10 stores the individual retrieval conditions, input by the condition input section 11. This condition storage section 10 has table style storage areas inside. More specifically, for each unit condition formula, the condition storage section 10 has a storage area 10a for storing the content of that formula, a storage area 10b for storing the type of a logic symbol (1 for "AND" and 2 for "OR") indicating the relation between that unit condition formula and the immediately preceding unit condition formula, and a storage area 10c for storing the priority order of this logic symbol (1, 2, . . . ; the same priority order may be designated for a plurality of logic symbols). When the type of a logic symbol is omitted for a unit condition formula, the condition input section 11 writes "0" in the storage area 10b for storing the type of a logic symbol associated with this unit condition formula. The priority order of a logic symbol is not input in the initial state. Therefore, the condition input section 11 sets the initial value "1" in all the storage areas 10c for storing the priority order of logic symbols. The combination of each unit condition formul and the type and priority order of a logic symbol associated with this unit condition formula, all written in the condition storage section 10, are hereinafter called "condition unit."

Figure 10:
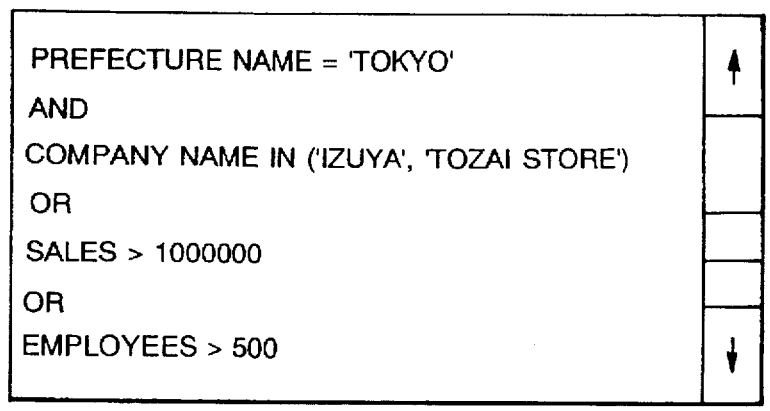
FIG. 10 is a diagram showing a display screen in the initial state according to the first embodiment of this invention.

The condition display section 12 reads the individual retrieval conditions from the condition storage section 10, and displays the retrieval conditions in a list form as shown in FIG. 10. That is, for each condition unit, the condition display section 12 displays the logic symbol (OR/AND/no logic symbol) corresponding to the logic symbol type (2/1/0), and displays the content of the unit condition formula in the next row. As mentioned above, in the initial state, the initial value "1" is set in all the storage areas 10c for storing the priority order of logic symbols. In the initial state, therefore, the heads of the individual retrieval conditions (which are the logic symbols and the contents of the unit condition formulae) are aligned at the tops of the rows. Further, the background colors of the individual retrieval conditions are the same over the entire area.

The condition operating section 13 processes each retrieval condition stored in the condition storage section 10 in accordance with the operation performed by the operator using the keyboard 11a and mouse 13a. That is, this condition operating section 13 deletes or adds a condition unit and sets or releases the priority order of a logic symbol.

To delete a condition unit, the operator drags the line on the display screen targeted for the deletion using the mouse 13a and presses a deletion button (not shown) on the keyboard 11a. Then, the condition unit is deleted from the condition storage section 10.

To add a condition unit, the operator clicks a line on the display screen on which new condition unit will be inserted using the mouse 13a and inputs a new unit condition formula and the type of a logic symbol through the keyboard 11a. Then, the new condition unit is added in the condition storage section 10.

Figure 11:
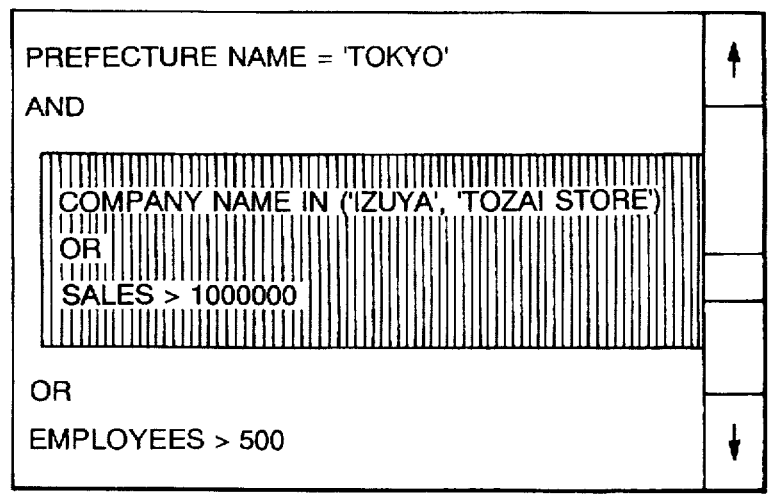
FIG. 11 is a diagram showing the state where a priority-given retrieval block is set in FIG. 10.

To set the priority order of a logic symbol, the operator drags the area on the display screen to which the priority order is designated, using the mouse 13a. As a result, specific information for specifying the logic symbol which is given a higher level of priority in a retrieval is input. Then, the priority order corresponding to the logic symbol included in the dragged area is raised. In other words, the numeral stored in the priority-order storage area 10c in the condition storage section 10, which corresponds to this logic symbol, is incremented by 1. When the priority order of a logic symbol is set in this manner, the condition display section 12 performs a distinctive display which alters the display form for the logic symbol and the associated unit condition formula on the display device 2 as shown in FIG. 11. More specifically, the heads of the logic symbol whose priority order has been set and the units condition formulae associated with this logic symbol (i.e. the unit condition formulae positioned directly above and below this logic symbol) are indented by one character, and the background color (or the density of the background color) is changed to be different from the color (or density) of the other part. The portion whose color (density) has been changed is what is to be retrieved with priority over the other parts. This part will be hereinafter called "priority-given retrieval block" (which means a block of retrieval conditions which should be treated with a higher level of priority in the retrieval. FIG. 11 exemplifies the case where the following three lines company name IN ('Izuya,' 'Tozai Store')

OR sales>1000000 are dragged to be set as a priority-given retrieval block.

Figure 12:
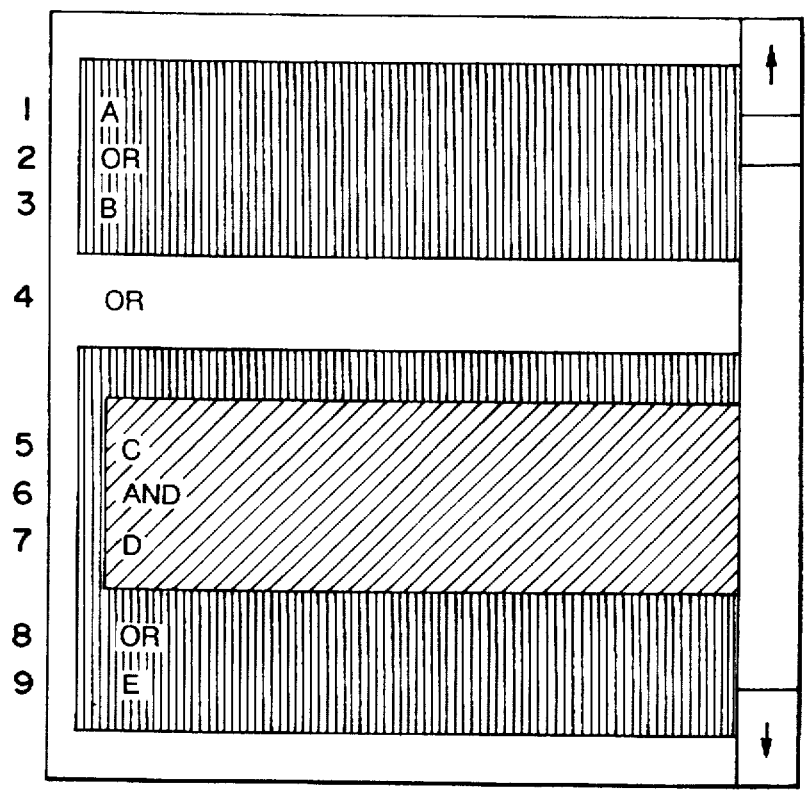
FIG. 12 is a diagram showing the state where two levels of priority-given retrieval blocks are set according to the first embodiment of this invention.

When dragging is performed within the area already set as the priority-given retrieval block, the condition operating section 13 further increments the priority order of the associated logic symbol by 1. When the priority order is raised further in this manner, the condition display section 12 executes a distinctive display which further alters the display form on the display device 2 as shown in FIG. 12. That is, the heads of the logic symbol whose priority order has been incremented and the units condition formulae associated with this logic symbol (i.e. the unit condition formulae positioned directly above and below this logic symbol) are further indented by one character in the priority-given retrieval block, and the background color (or the density of the background color) is changed to a more different color (or density).

The background color (or the density of the background color) is determined for each level (priority order) of a priority-given retrieval block in advance. For example, it is predetermined in such a way that the color changes from a warm color (e.g., red) to a cold color (e.g., blue) every time the priority order is raised, or that the color changes from a lighter color to a darker color. This scheme facilitates easier visual grasping of the level of the priority order by color (density). (It is apparent that in FIG. 12, the level of "A OR B" is the same as the level of "(C AND D) OR E" and the level of "C AND D" is higher by one from the former level.)

To release the setting of the priority order of a logic symbol, the operator clicks any part of the target priority-given retrieval block on the display screen with the mouse 13a, and presses a release button on the keyboard 11a. Then, the priority order corresponding to the logic symbol included in this priority-given retrieval block is decreased. In other words, the numeral stored in the priority-order storage area 10c in the condition storage section 10, which corresponds to this logic symbol, is decremented by 1. When the setting of the priority order of a logic symbol is released in this manner, the condition display section 12 changes the associated display form on the display device 2. More specifically, the heads of the logic symbol whose priority order has been decremented and the units condition formulae associated with this logic symbol (i.e. the unit condition formulae positioned directly above and below this logic symbol) are shifted up by one character, and the background color (or the density of the background color) is set to the same as the ambient color (or density).

Based on the individual retrieval conditions stored in the condition storage section 10, the condition building section 14 builds a condition formula (condition statement in a database language like the SQL) mathematically expressed. This is because the retrieving program executed by the retrieval executing section 15 accepts only a serch command including a condition formula in this form.

The retrieval executing section 15 searches the database 3 based on the accepted condition formulae, and reports the resultant data to the retrieval result display section 16.

The retrieval result display section 16 performs a process of displaying the data, informed by the retrieval executing section 15, on the display device 2.

<Algorithms>

Algorithms to be executed in the individual functional sections constructed as described above will be discussed below.

<<Algorithm Executed by Condition Display Section>>

Figure 3:
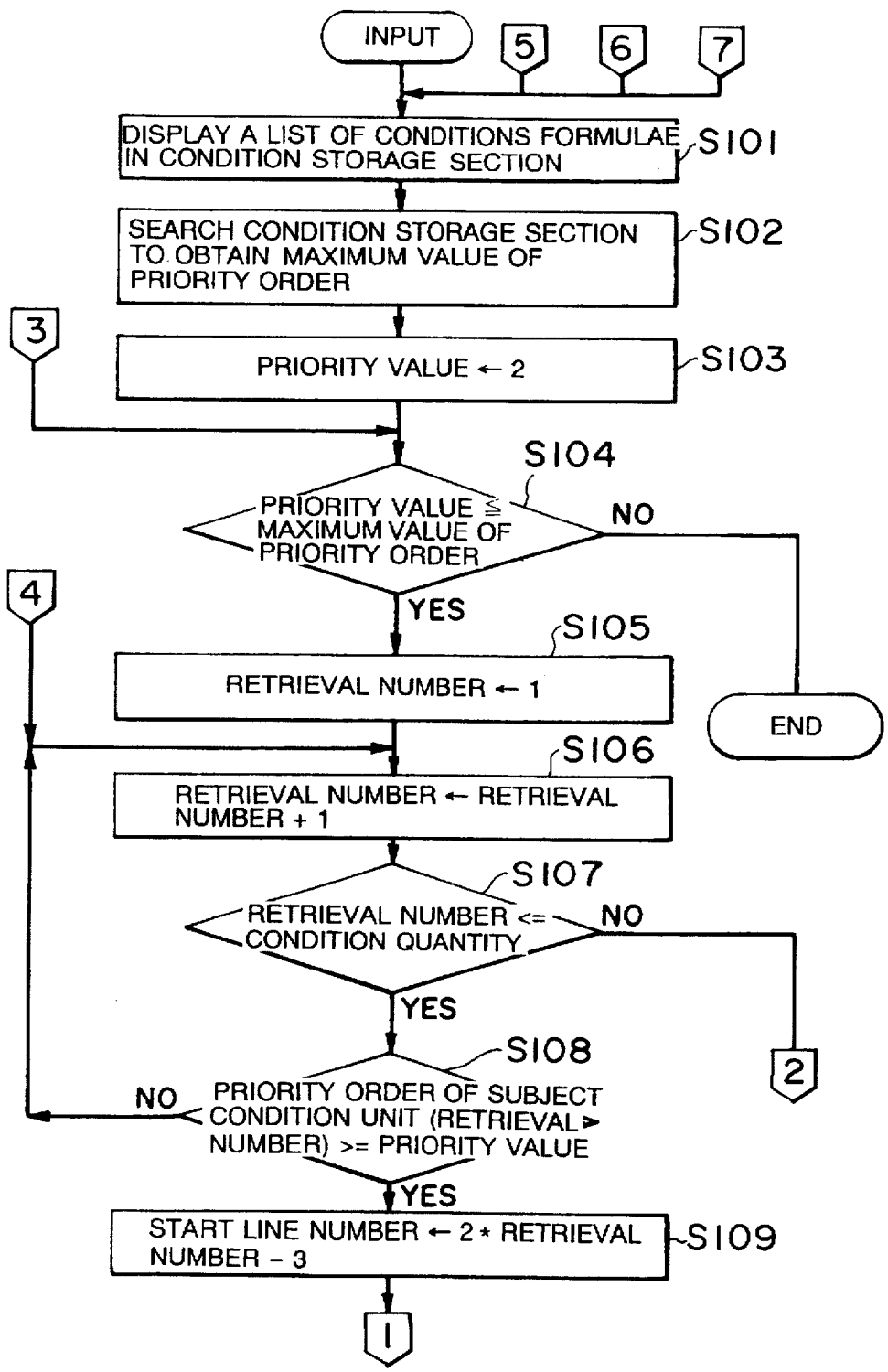
FIG. 3 is a flowchart illustrating an algorithm which is executed in a condition display section in FIG. 2.
Figure 4:
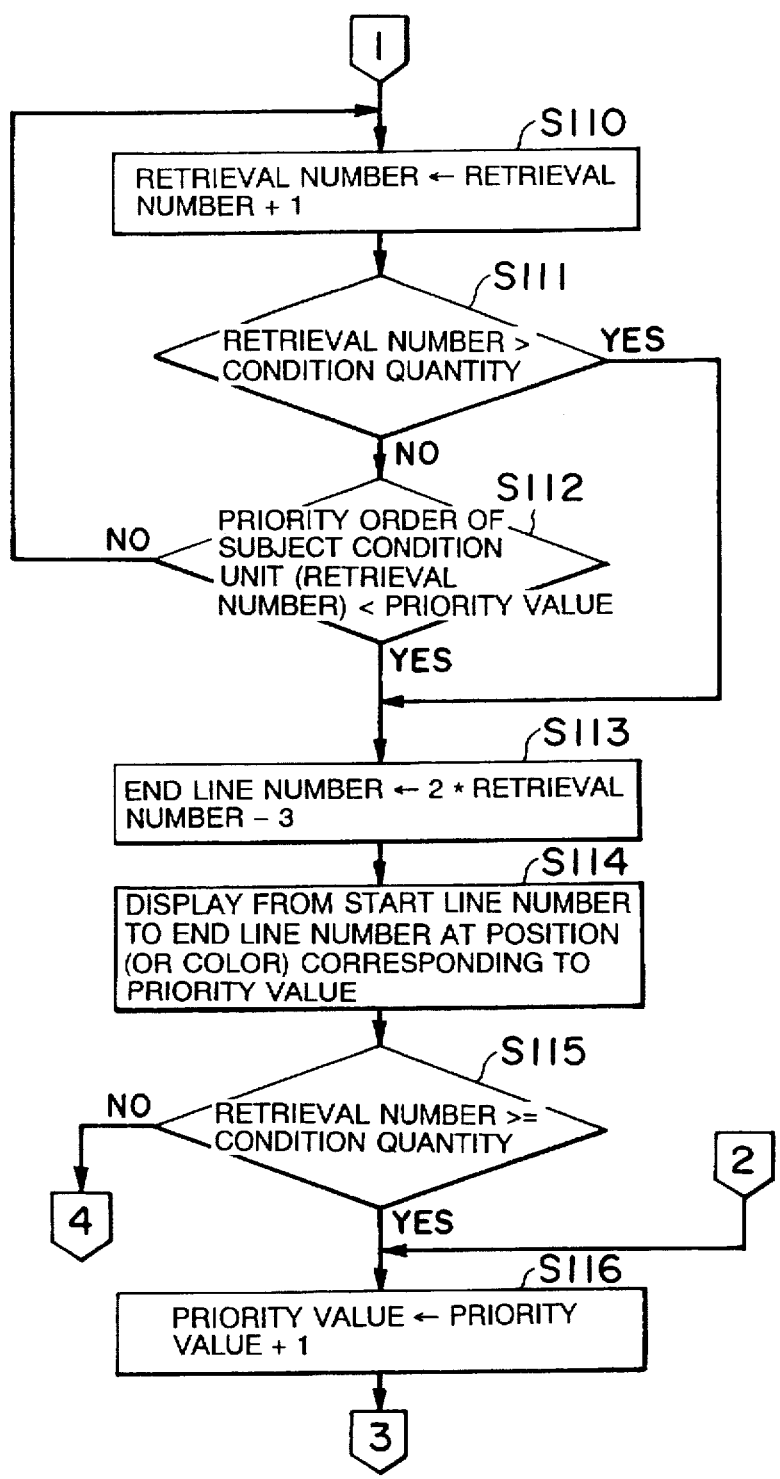
FIG. 4 is a flowchart illustrating the algorithm which is executed in the condition display section in FIG. 2.

FIGS. 3 and 4 present a flowchart illustrating a condition displaying algorithm which is executed by the condition display section 12.

In FIG. 3, this process starts when the inputting of retrieval conditions in the condition input section 11 is completed. The operator inputs retrieval conditions via the condition input section 11 in an interactive manner. More specifically, when a unit condition formula is input, the operator is inquired whether to continue or terminate the inputting of a next condition unit. When the operate depresses a button on the keyboard 11a which indicates "continue" in response to the query, the operator is asked which type the logic symbol in the next condition unit is, following by the query for the content of a unit condition formula in the condition unit. When the operator repeats such an interactive process and depresses a button on the keyboard 11a which indicates "end," the process in FIG. 3 starts.

The process in FIG. 3 also starts when the addition or deletion of a retrieval condition or the setting of the priority order of a logic symbol is performed by the condition operating section 13 and the process is handed from the condition operating section 13 (see connectors "5" through "7" in FIG. 3).

In the first step S101 after the process starts, a list of retrieval conditions stored in each condition storage area in the condition storage section 10 is displayed. The individual condition units are read in order one by one from the head position (uppermost portion) from the condition storage section 110. The value 10b indicative of the type of a logic symbol is read first from each read condition unit, and the logic symbol corresponding to this value is displayed at the head of the display line (no logic symbol is displayed when the value is "0"). Then, a unit condition formula 10a is read from the same condition unit and is displayed at the head of the next line. This display is repeated for each condition unit until the condition unit stored at the lowest position in the condition storage section 10 is processed.

In the next step S102, the condition storage area 10c of the condition storage section 10 is searched for the maximum value for the priority order.

In the subsequent step S103, "2" is set to the "priority value" which is a variable in the process.

In the next step S104, this "priority value" is compared with the "maximum value for the priority order" obtained in step S102. When the "priority value" exceeds the "maximum value for the priority order," the priority-given retrieval block is no longer displayed on the display screen so that the process is terminated. For example, when the process enters this step immediately after the initial input made by the condition input section 11, the "maximum value for the priority order" is "1" so that the process is terminated.

When it is determined in step S104 that the "priority value" is equal to or smaller than the "maximum value for the priority order" (the process is handed from the condition operating section 13), the process goes to step S105. In this step S105, "1" is set to a "retrieval number" which is a variable in the process. This "retrieval number" corresponds to the serial number of condition units from the head.

The loop of the subsequent steps S106 to S108 is a process of detecting a head line of a priority-given retrieval block. First, the current "retrieval number" is incremented by 1 in step S106. In the next step S107, the current "retrieval number" is compared with the number of all the condition units (hereinbelow, described as "condition quantity") stored in the condition storage section 10. When the "retrieval number" is greater than the "condition quantity," which is the case where the process has been executed to the last condition unit stored in the condition storage section 10, the process proceeds to step S116. When the "retrieval number" is determined to be equal to or smaller than the "condition quantity," on the other hand, the process proceeds to step S108.

In this step S108, the priority order 10c of the logic symbol in the condition unit indicated by the current "retrieval number" is compared with the current "priority value." When the priority order 10c in the condition unit is smaller than the current "priority value," it is unnecessary to set a priority-given retrieval block so that the process returns to step S106. When the priority order 10c in the condition unit is equal to or greater than the current "priority value," it is necessary to set a priority-given retrieval block so that the process goes to step S109.

In this step S109, a value is obtained by doubling the value of the "retrieval number" and then subtracting 3 from the resultant value, which is set as a "start line number." That is, as there are two display lines associated with one condition unit (a display line for a logic symbol and a display line for a unit condition formula), the "retrieval number" is doubled first.

Since there is no logic symbol corresponding to the top condition unit, 1 is subtracted from the resultant value. As the priority-given retrieval block starts with the display line for the unit condition formula in a condition unit immediately preceding the subject condition unit, 2 is further subtracted from the resultant value. For example, the logic symbol "OR" before "sales>1000000" in FIG. 11 belongs to the condition unit of "retrieval number"=3, and the priority-given retrieval block should start with the third line "company name IN ('Izuya,' 'Tozai Store')," so that 2*3−3=3 (third line) is calculated.

The process of the subsequent steps S110 to S112 is for detecting the end line in the priority-given retrieval block. First, the current "retrieval number" is incremented by 1 in step S110.

In the next step S111, the current "retrieval number" is compared with the "condition quantity." When the "retrieval number" exceeds the "condition quantity," which is the case where the priority-given retrieval block lasts until the last condition unit in the condition storage section 10, the process proceeds to step S113. When the "retrieval number" is determined to be equal to or smaller than the "condition quantity," on the other hand, the process proceeds to step S112.

In this step S112, the priority order 10c of the logic symbol in the condition unit indicated by the current "retrieval number" is compared with the current "priority value." When the priority order 10c in this condition unit is equal to or greater than the current "priority value," the condition unit is still located in the priority-given retrieval block, so that the process returns to step S110. When the priority order 10c in the condition unit is smaller than the current "priority value," the priority-given retrieval block has finished, so that the process proceeds to step S113.

In this step S113, a value is obtained by doubling the "retrieval number" and then subtracting 3 from the resultant value, which is set as a "end line number." That is, as there are two display lines associated with one condition unit (a display line for a logic symbol and a display line for a unit condition formula), the "retrieval number" is doubled first. Since there is no logic symbol corresponding to the top condition unit, 1 is subtracted from the resultant value. As the priority-given retrieval block ends at the display line for the unit condition formula in a condition unit immediately preceding the subject condition unit, 2 is further subtracted from the resultant value. For example, the logic symbol "OR" before "employees>500" in FIG. 11 belongs to the condition unit of "retrieval number" =4, and the priority-given retrieval block should end at the fifth line "sales >1000000," so that 2 * 4−3=5 (fifth line) is calculated.

The subsequent step S114 is for visually specifying the range of the priority-given retrieval block on the display screen. In other words, the individual lines from the line corresponding to the "start line number" specified in step S109 to the line corresponding to the "end line number" specified in step S113 are displayed at the position equivalent to the current "priority value" (position indented by one charactor from the head of each line) and the background color of those lines is changed to the color corresponding to the current "priority value."

In the subsequent step S115, the current "retrieval number" is compared with the "condition quantity." When the "retrieval number" is smaller than the "priority value," the last condition unit has not been reached so that the process returns to step S106 to detect the next priority-given retrieval block for the subject "priority value." When the "retrieval number" is equal to or greater than the "priority value," on the other hand, the last condition unit has been reached so that the process proceeds to step S116.

In this step S116, the current "priority value" is incremented by 1 to execute a process with the next "priority value." Then, the process returns to step S104.

<<Condition Unit Deleting Algorithm in Condition Operating Section >>

Figure 5:
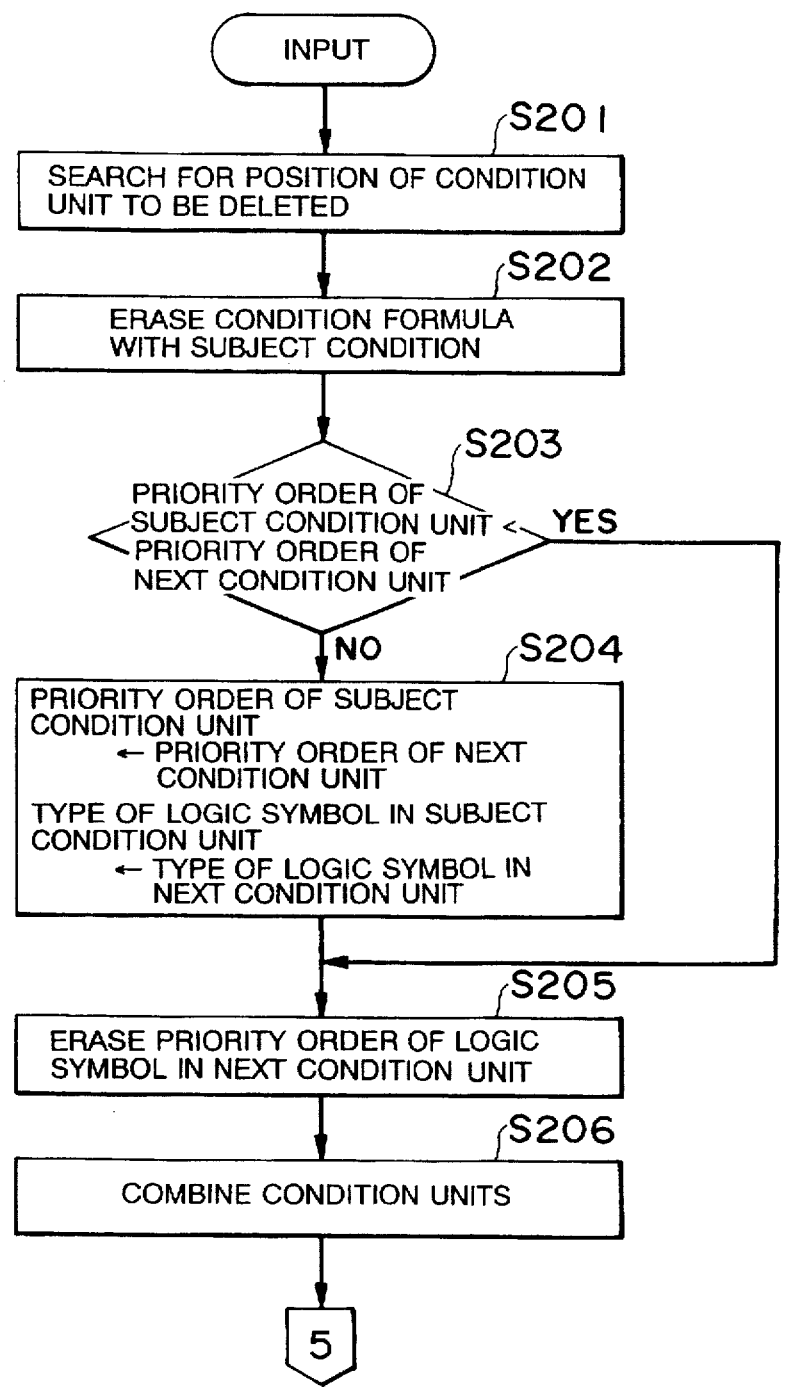
FIG. 5 is a flowchart illustrating an algorithm for deleting a condition unit, which is executed in a condition operating section in FIG. 2.

FIG. 5 is a flowchart illustrating a condition unit deleting algorithm which is executed by the condition operating section 13.

In FIG. 5, the process starts when the line to be deleted is specified by the mouse 13a and the deletion button on the keyboard 11a is depressed. In the first step S201, the position of the condition unit to be deleted is searched. That is, the condition storage section 10 is searched for the condition unit corresponding to the display line dragged by the mouse 13a.

In the next step S202, the content of the area 10a for the unit condition formula belonging to the condition unit searched out in step S201 is erased from the condition storage section 10.

In the subsequent step S203, the priority order of the logic symbol belonging to the condition unit searched out in step S201 is compared with the priority order of a logic symbol belonging to the next condition unit. When the priority order of the logic symbol belonging to the subject condition unit is smaller than the priority order of the logic symbol belonging to the next condition unit, the process proceeds to step S205. When the priority order of the former logic symbol is equal to or greater than the priority order of the latter logic symbol, however, the process proceeds to step S204.

In step S204, the value of the priority order of the logic symbol belonging to the next condition unit is overwritten in the storage area 10c for the priority order of the logic symbol belonging to the subject condition unit, and the value of the type of the logic symbol belonging to the next condition unit is overwritten in the storage area 10b for the type of the logic symbol belonging to the subject condition unit. Then, the process goes to step S205.

In step S205, the information about the type and priority order of the logic symbol belonging to the next condition unit is erased.

In the next step S206, the subject condition unit is linked to the next condition unit. That is, the storage area 10b for the type of the logic symbol belonging to the subject condition unit and the storage area 10c for the priority order of this logic symbol are combined with the storage area 10a for the content of the unit condition formula belonging to the next condition unit, yielding one condition unit. If there is no subsequent condition unit, however, the subject condition unit is entirely deleted. As one line of the storage area becomes empty due to the execution of this process, the following condition units are shifted up one by one and are re-stored.

After the above processing, the process is handed to the condition display section 12 (step S101).

A specific example of the deletion of a condition unit which is executed as a consequence of the process shown in FIG. 5 will be described below. In the following description, individual condition units are described as follows.

w(and/or, x)

where the variable w indicates the content of the condition formula, "and/or" indicates the type of the logic symbol and the variable x indicates the priority order (linkage strength) of the subject logic symbol.

Deletion Example 1

Suppose that a retrieval formula expressed by

A and (B or C)

is set in the initial state. In this case, the following three condition units are stored in the condition storage section 10.

A(, ) . . . $\alpha$

B(and, 1) . . . $\beta$

C(or, 2) . . . $\gamma$

To delete the condition unit $\beta$ for the unit condition formula B from this initial state, this unit condition formula B for is erased first. Then, since the priority order is $\beta<\gamma$, the type and priority order of the logic symbol in the condition unit $\gamma$ are erased directly in step S205. As a result, the individual condition units become as follows.

A(, ) . . . $\alpha$ (and, 1) . . . $\beta$

C(, ) . . . $\gamma$

Combining those condition units yields the following condition units.

A(, ) . . . $\alpha$

C(and, 1) . . . $\beta$

That is, the entire retrieval formula becomes

A and C.

Deletion Example 2

To delete the condition unit $\gamma$ for the unit condition formula C from the same initial state as the deletion example 1, this unit condition formula C is erased first. Then, since there is no further condition unit, the process proceeds to step S205. That is, the type and priority order of the logic symbol in the condition unit $\gamma$ are not altered. As a result, the individual condition units become as follows.

A(, ) . . . $\alpha$

B(and, 1) . . . $\beta$ (or, 2) . . . $\gamma$

Combining those condition units yields the following condition units.

A(, ) . . . $\alpha$

B(and, 1) . . . $\beta$

That is, the entire retrieval formula becomes

A and B.

Deletion Example 3

Suppose that a retrieval formula expressed by (A or B) and (C or D)

is set in the initial state. In this case, the following four condition units are stored in the condition storage section 10.

A(, ) . . . $\alpha$

B(or, 2) . . . $\beta$

C(and, 1) . . . $\gamma$

D(or, 2) . . . $\delta$

To delete the condition unit $\gamma$ for the unit condition formula C from this initial state, this unit condition formula C is erased first. Then, since the priority order is $\gamma<\delta$, the type and priority order of the logic symbol in the condition unit $\delta$ are erased in step S205. As a result, the individual condition units become as follows.

A(, ) . . . $\alpha$

B(or, 2) . . . $\beta$ (and, 1) . . . $\gamma$

D(, ) . . . $\delta$

Combining those condition units yields the following condition units.

A(, ) . . . $\alpha$

B(or, 2) . . . $\beta$

D(and, 1) . . . $\gamma$

That is, the entire retrieval formula becomes (A or B) and C.

Deletion Example 4

To delete the condition unit $\beta$ for the unit condition formula B from the same initial state as the deletion example 3, this unit condition formula B is erased first. Then, since the priority order is β>γ, the type and priority order of the logic symbol in the condition unit γ are copied in the condition unit β in step S204 and the type and priority order of the logic symbol in the condition unit γ are erased in step S205. As a result, the individual condition units become as follows.

A(, ) ... α
(and, 1) ... β
C(, ) ... γ
D(or, 1) ... δ

Combining those condition units yields the following condition units.

A(, ) ... α
C(and, 1) ... β
D(or, 2) ... γ

That is, the entire retrieval formula becomes

A and (C or D).

<<Condition Unit Inserting Algorithm in Condition Operating Section >>

Figure 6:
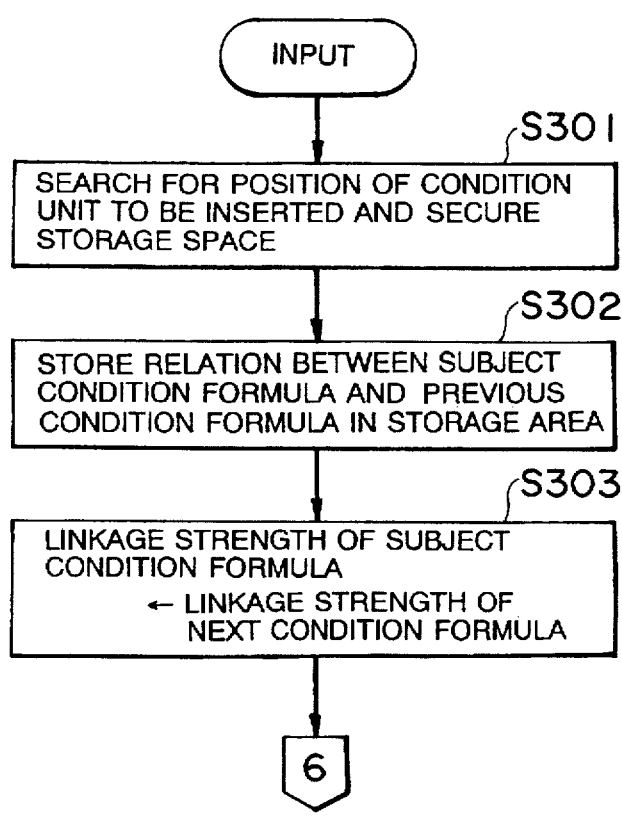
FIG. 6 is a flowchart illustrating an algorithm for inserting a condition unit, which is executed in the condition operating section in FIG. 2.

FIG. 6 is a flowchart illustrating a condition unit inserting algorithm which is executed by the condition operating section 13.

In FIG. 6, this process starts when the insertion position is specified by the mouse 13a and the insertion contents (the content of the unit condition formula to be inserted and the type of the associated logic symbol with respect to the condition formula of the previous term) are input through the keyboard 11a. In the first step S301, the position of the condition unit to be inserted is searched and a storage space is secured. hat is, the storage locations of all the condition units stored under the insertion position in the condition storage section 10 are shifted down one by one, preparing an empty line.

In the next step S302, the content of the unit condition formula to be inserted and the type of the associated logic symbol with respect to the condition formula of the previous term, input through the keyboard 11a, are stored in the storage space obtained in step S301.

In the next step S303, the value of the priority order of a logic symbol belonging to the next condition unit is overwritten in the storage area 10c for the priority order of the logic symbol belonging to the subject condition unit.

After the above processing, the process is handed to the condition display section 12 (step S101).

A specific example of the insertion of a condition unit which is executed as a consequence of the process shown in FIG. 6 will be described below.

Insertion Example 1

Suppose that a retrieval formula expressed by A and (B or C) is set in the initial state. In this case, the following three condition units are stored in the condition storage section 10.

A(, ) ... α
B(and, 1) ... β
C(or, 2) ... γ

Let us consider the insertion of the following condition unit α' after the condition unit α in this initial state.

D(or, ) ... α'

This condition unit α' is stored in the condition storage section 10 and the priority order of the condition unit β is copied. As a result, the individual condition units become as follows.

A(, ) ... α

D(or, 1) ... α'
B(and, 1) ... β
C(or, 2) ... γ

That is, the entire retrieval formula becomes

A or D and (B or C).

<<Algorithm for Setting Priority Order of Logical Symbol in Condition Operating Section >>

Figure 7:
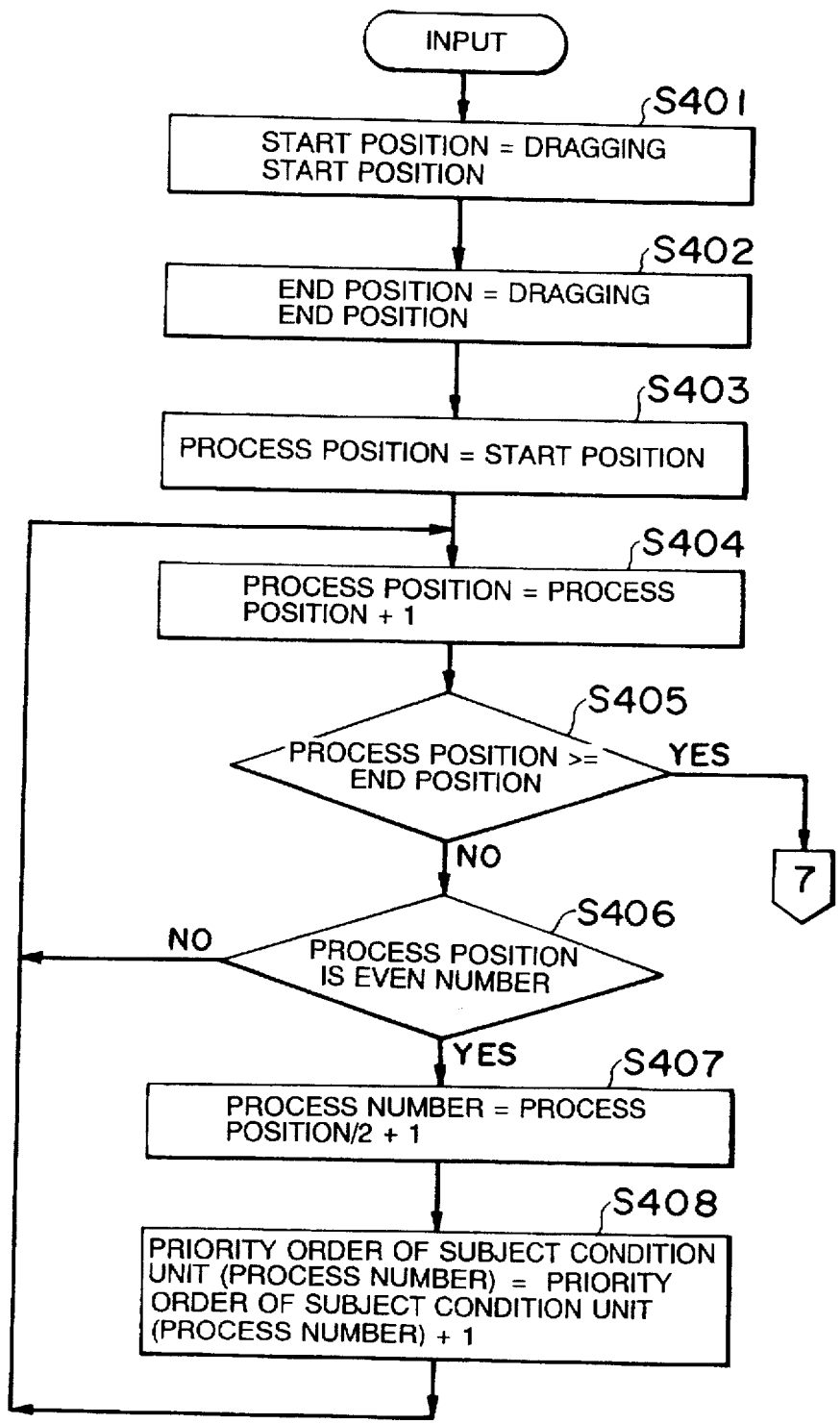
FIG. 7 is a flowchart illustrating an algorithm for setting the priority order of logic symbols, which is executed in the condition operating section in FIG. 2.

FIG. 7 is a flowchart illustrating an algorithm for setting the priority order of a logic symbol, which is executed by the condition operating section 13.

In FIG. 7, this process starts when the lines of the priority-given retrieval block to be specified are dragged by the mouse 13a. In the first step S401, the line number of the dragging start position is defined as a "start position." In the next step S402, the line number of the dragging end position is defined as an "end position."

In the subsequent step S403, the value of the "start position" defined in step S401 is substituted for variable "process position."

In the next step S404, the value of the current "process position" is incremented by 1.

In the next step S405, the value of the current "process position" is compared with the value of the "end position" defined in step S402. When the "process position" is smaller than the "end position," the process proceeds to step S406.

In this step S406, it is checked if the current "process position" is an even number. When the "process position" is an odd number, the current "process position" is a line on the display screen on which a unit condition formula is described. Since the priority order cannot be set for this line, therefore, the process returns to step S404. When the "process position" is an even number, on the other hand, the process moves to step S407.

In this step S407, a condition unit whose priority order should be raised is specified based on the value of the current "process position." That is, the value of the current "process position" is halved and the resultant value is incremented by 1. The resultant value is the number of the condition unit whose priority order should be raised, as counted from the top in the condition storage section 10. In FIG. 11, for example, if the current "process position" is "4" indicating the line for "OR" before "sales>1000000," the number is calculated as ½+1=3 (third). So, it is to be understood that the priority order of the third condition unit, "sales>1000000 (OR,)," should be raised.

In the subsequent step S408, the value in the area 10c, for the priority order of the logic symbol belonging to the condition unit associated with the "number" obtained by the process in step S407 is shifted up by 1. Then, the process returns to step S404.

When it is determined in step S405 that the above processing is executed and the current "process position" becomes equal to or over the "end position," the process is handed to the condition display section 12 (step S101).

<<Algorithm in Condition Building Section >>

Figure 8:
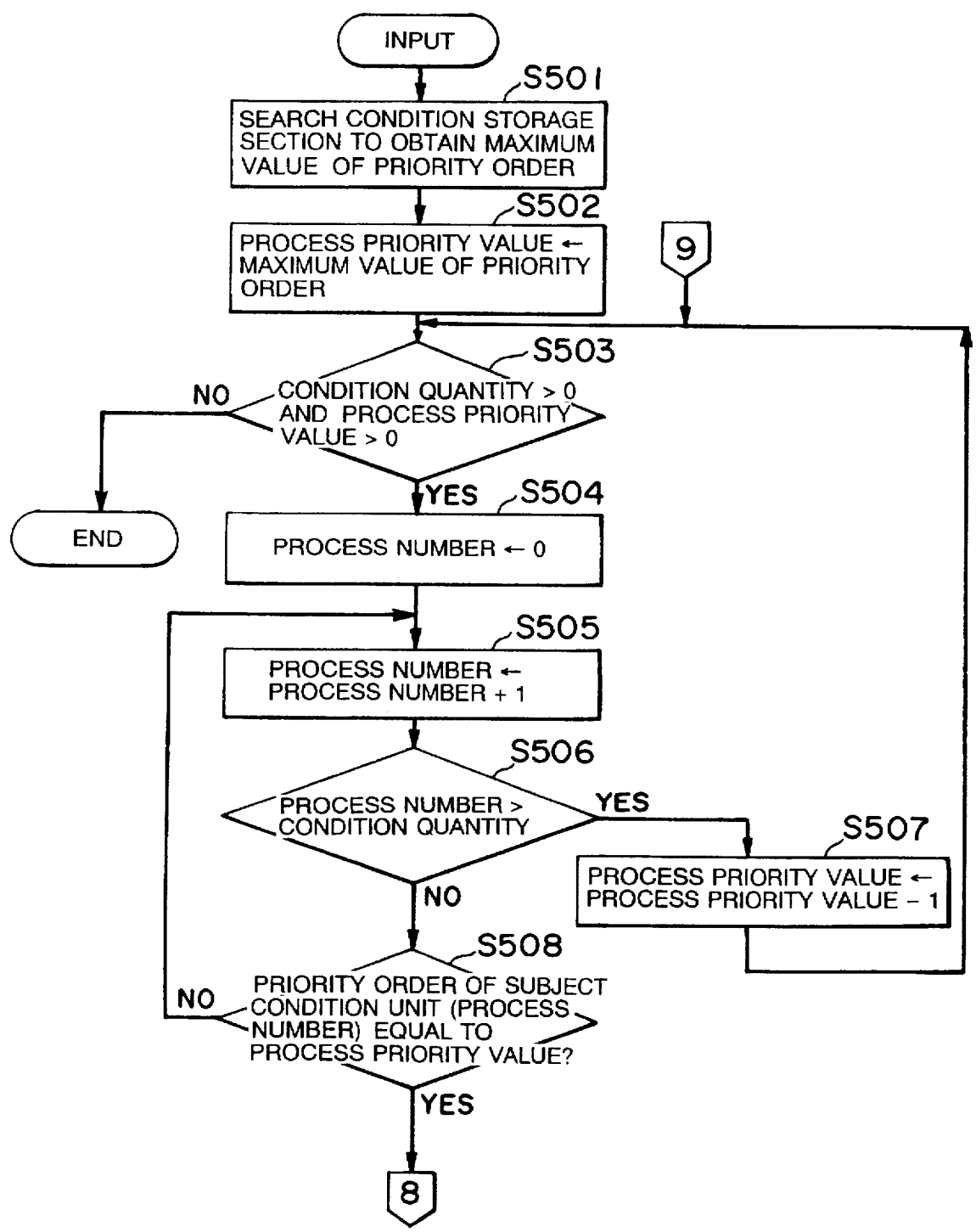
FIG. 8 is a flowchart illustrating an algorithm, which is executed in a condition building section in FIG. 2.
Figure 9:
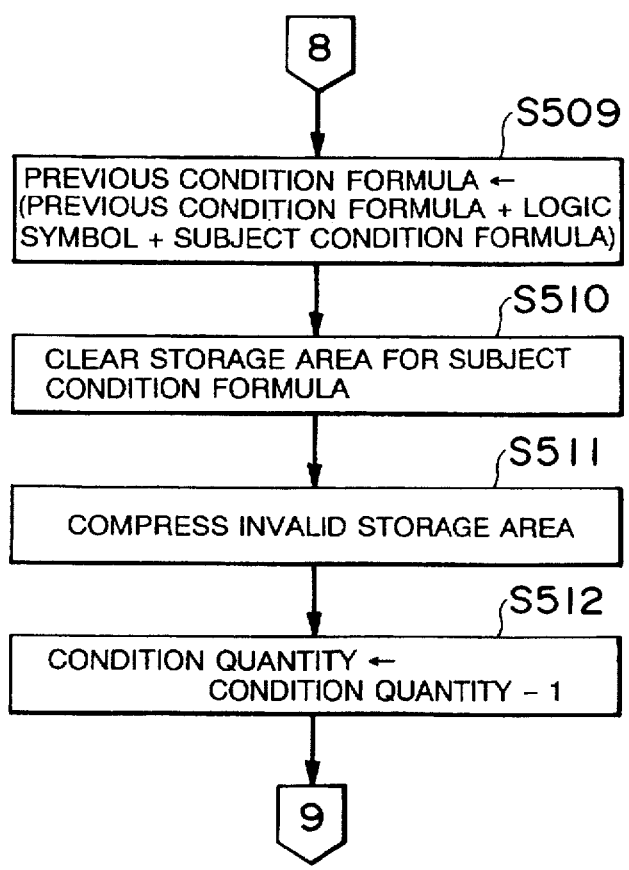
FIG. 9 is a flowchart illustrating the algorithm, which is executed in the condition building section in FIG. 2.

FIGS. 8 and 9 present a flowchart illustrating a retrieval formula building algorithm which is executed by the condition building section 14. A retrieval formula created in accordance with this flowchart is used to prepare a retrieval state by the SQL.

In FIG. 8, this process starts upon the depression of an execution button (not shown) on the keyboard 11a by the operator.

In the first step S501 after the process has started, the priority orders of the logic symbols stored in the condition storage section 10 are searched for the maximum value for the priority order.

In the next step S502, the maximum value for the priority order obtained in step S501 is substituted for a variable "process priority value."

In the subsequent step S503, it is determined if the number of all the condition units stored in the condition storage section 10 ("condition quantity") is greater than "0" and if the current "process priority value" is greater than "0." When those two decisions are both "YES," the process proceeds to step S504.

In this step S504, "0" is set to a variable "process number."

In the subsequent step S505, the value of the current "process number" is incremented by 1.

In the next step S506, the current "process number" is compared with the "condition quantity." When the "process number" is equal to or smaller than the "condition quantity," the process goes to step S508.

In this step S508, it is determined whether or not the priority order of the logic symbol in the condition unit indicated by the current "process number" is equal to the current "process priority value." When the priority order 101c in the subject condition unit is not equal to the current "process priority value," the process returns to step S505. When the priority order in the subject condition unit is equal to the current "process priority value," on the other hand, the process proceeds to step S509.

In this step S509, the following formula is constructed from the condition unit indicated by the current "process number" and a condition unit stored before this condition unit.

(previous condition formula+logic symbol+subject condition formula)

The "subject condition formula" is the description of the content of the unit condition formula belonging to the condition unit indicated by the current "process number." The "logic symbol" in the above formula corresponds to the type of the logic symbol belonging to the condition unit indicated by the current "process number." The "previous condition formula" is the description of the content of the unit condition formula belonging to the condition unit stored before the current condition unit. When the preparation of the above formula is completed, this formula is overwritten in the storage area 10a where the previous condition formula has been stored in the state where the entire formula is parenthesized. When the previous condition unit becomes a process target in the subsequent processing, therefore, the entire overwritten formula is treated as a unit condition formula.

In the next step S510, the storage area for the condition unit indicated by the current "process number" is cleared.

In the next step S511, the storage area which becomes invalid (empty) by the clearing process in step S510 is compressed. That is, the condition units stored below this storage area are shifted upward one by one.

In the subsequent step S512, the current "condition quantity" is decremented by 1 and the process then returns to step S503.

When it is determined in step S506 that the "process number" is greater than the "condition quantity," which is the case where the processing has been executed to the last condition unit stored in the condition storage section 10 with respect to the current "process priority value," the process advances to step S507. In this step S507, the current "process priority value" is decremented by 1. Then, the process returns to step S503 to execute the process for the next "process priority value."

When the above processing is repeated and the current "condition quantity" becomes "0" or the current "process priority value" becomes "0" in step S503, the process is terminated.

Through the above-described processing, the retrieval formula mathematically expressed by the combination of unit condition formulae, logic symbols and parentheses indicating the priority order is created. The condition building section 14 prepares a SQL-written retrieval statement based on this retrieval formula, and supplies it to the retrieval executing section 15.

Second Embodiment

The second embodiment of this invention differs from the first embodiment only in the arrangement on the display screen of the display device 2. More specifically, while the individual retrieval conditions (unit condition formulae and logic symbols) are displayed line after line in the displaying in step S101 in the first embodiment, the individual retrieval conditions (unit condition formulae and logic symbols) are displayed on the same row to provide a list as shown in FIG. 13. FIG. 13 is prepared as corresponding to FIG. 12 of the first embodiment.

As shown in FIG. 13, the concept of "unit block numbers" is used in the second embodiment instead of the concept of the "line numbers" in the first embodiment. That is, each row on the display screen is horizontally divided to a plurality of areas which are treated as unit blocks 20. A single retrieval condition (unit condition formulae and a logic symbol) is written in each unit block 20. The priority-given retrieval block is set with this unit block as a unit. Therefore, the background color is altered unit block by unit block. It is to be noted that the size (length) of each condition unit varies depending on the length of the retrieval condition to be written there.

Since the system structure in the second embodiment is quite the same as that in the first embodiment, its description will be omitted. Further, since the processing executed in the second embodiment is the same as that executed in the first embodiment except for the "line" in the first embodiment changed to the "unit block," its description will be omitted.

The essential structural elements of this invention allow an operator to easily set the priority order of logic symbols in a data retrieval condition without requiring the mathematical thinking.

The invention being thus described, it will be obvious that the same may be varied in many ways, such variations are not to be regarded as a departure from the spirit and scope of the invention, and all such modifications as would be obvious to one skilled in the art are intended to be included within the scope of the following claims.

What is claimed is:

1. A method of setting a data retrieval condition for retrieving data from a database, said method comprising the steps of:

displaying unit retrieval conditions separated by logic symbols which logically associate said unit retrieval conditions with each other, on a display device;

receiving specific information for specifying one of said logic symbols based on which priority-given retrieval is executed;

highlighting with color or display density the logic symbol indicated by said received specific information and the unit retrieval conditions displayed adjacent to said logic symbol from other unit retrieval conditions or other logic symbols; and logically building said data retrieval condition based on said unit retrieval conditions, said logic symbols and said specific information.

2. The method according to claim 1, wherein, after highlighting, if specific information for said logic symbol which is positioned in a range of the highlighting and based on which data priority-given retrieval is executed with further priority is further received, said logic symbol indicated by said further received specific information and unit retrieval conditions displayed adjacently to said logic symbol are highlighted with color or display density in a manner distinguishable from the already highlighted display.

3. The method according to claim 1, wherein the highlighting is accomplished by setting a background color of said unit retrieval condition and said logic symbol different from a background color of other unit retrieval conditions and logic symbols.

4. The method according to claim 1, wherein the highlighting is accomplished by setting a density of a background color of said unit retrieval condition and said logic symbol different from a density of a background color of other unit retrieval conditions and logic symbols.

5. The method according to claim 1, wherein said specific information is input by specifying a particular logic symbol by a cursor displayed on said display device in response to a movement of an input device for executing an input.

6. The method according to claim 1, wherein a data retrieval condition for retrieving data from said database is logically built up in such a manner that a retrieval based on said logic symbol indicated by said specific information and unit retrieval conditions displayed adjacently to that logic symbol is performed with a higher level of priority, and a further retrieval is executed based on another logic symbol, another unit retrieval condition and data obtained by execution of said priority-given retrieval.

7. A method of setting a data retrieval condition for retrieving data from a database, said method comprising the steps of:

alternately displaying unit retrieval conditions and logic symbols for logically associating said unit retrieval conditions with each other on a display device, with first letters of each of said unit retrieval conditions and logic symbols put side by side, said input unit retrieval conditions and logic symbols are displayed line after line on said display device, with display positions of heads of said input unit retrieval conditions and logic symbols being aligned in a same column; and receiving specific information for specifying ones of said logic symbols based on which priority-given retrieval is executed;

shifting display positions of all of said logic symbol which are indicated by said received specific information and unit retrieval conditions adjacent to said indicated logic symbols on said display device, wherein a display column of heads of said unit retrieval condition and said logic symbol which are subjected to said distinctive display is shifted by a given amount; and logically building said data retrieval condition based on said unit retrieval conditions, said logic symbols and said specific information.

* * * * *